United States Patent
Ahn et al.

(10) Patent No.: US 6,560,290 B2
(45) Date of Patent: *May 6, 2003

(54) CMOS DRIVER AND ON-CHIP TERMINATION FOR GIGABAUD SPEED DATA COMMUNICATION

(75) Inventors: Gijung Ahn, Seoul (KR); Deog-Kyoon Jeong, Seoul (KR); Gyudong Kim, Sunnyvale, CA (US)

(73) Assignee: Silicon Image, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,619

(22) Filed: Jan. 20, 1999

(65) Prior Publication Data
US 2002/0064247 A1 May 30, 2002

Related U.S. Application Data

(63) Continuation-in-part of application No. 09/146,818, filed on Sep. 4, 1998, now Pat. No. 6,229,859.

(60) Provisional application No. 60/071,879, filed on Jan. 20, 1998.

(51) Int. Cl.[7] ............................ H04L 27/00; H04L 5/16; H03B 1/00
(52) U.S. Cl. ........................ 375/259; 375/219; 327/108
(58) Field of Search ................. 375/219, 259, 375/227, 365, 373, 376, 257; 326/86, 71, 96, 93; 327/108, 156, 157, 155, 141

(56) References Cited

U.S. PATENT DOCUMENTS

| | | | | | |
|---|---|---|---|---|---|
| 5,418,478 A | * | 5/1995 | Brunt et al. | ................... | 326/86 |
| 5,883,538 A | * | 3/1999 | Keeth et al. | ................ | 327/333 |
| 5,974,464 A | * | 10/1999 | Shin et al. | ................... | 709/231 |
| 5,999,019 A | * | 12/1999 | Zheng et al. | ................. | 326/98 |
| 6,025,742 A | * | 2/2000 | Chan | ........................ | 327/108 |
| 6,057,718 A | * | 5/2000 | Keeth | ........................ | 327/112 |
| 6,173,423 B1 | * | 1/2001 | Autechaud et al. | ........... | 714/41 |

FOREIGN PATENT DOCUMENTS

| | | | | |
|---|---|---|---|---|
| WO | WO 97/42731 | 11/1997 | ........... | H04L/7/033 |
| WO | WO 99/12306 | 3/1999 | ........... | H04L/7/033 |

OTHER PUBLICATIONS

Svensson, Christer, et al., "High Speed CMOS Chip to Chip Communication Circuit," 1991 IEEE International Symposium On Circuits And Systems, Singapore, Jun. 11–14, 1991, vol. 4, pp. 2228–2231.

(List continued on next page.)

*Primary Examiner*—Chi Pham
*Assistant Examiner*—Khai Tran
(74) *Attorney, Agent, or Firm*—Perkins Coie LLP (57) ABSTRACT

New very high-speed CMOS techniques are used to achieve a CMOS driver operating at gigabaud speeds. Such a driver may be manufactured more easily than drivers that use GaAs or bipolar techniques and further may be easily integrated with other CMOS circuits. A communication system utilizing the gigabaud CMOS driver may additionally include a receiver with on-chip termination to significantly reduce distortion in the presence of parasitic capacitance in inductance in comparison to a receiver with external termination. Furthermore, the communication system may include a phase tracker and a frame aligner. The phase tracker continuously monitors the most frequent transition edges in the oversampled data so that the phase of the receiver clock keeps track of the sender clock. The frame aligner comprises a comma detector which enables instant synchronization of data words with a single comma character within a serial data stream.

18 Claims, 9 Drawing Sheets

On-chip termination circuit

OTHER PUBLICATIONS

Gogaert, S., et al., "622 Mbit/s board–to–board link in 0.5 μm CMOS technology," Proceedings of the IEEE 1995 Custom Integrated Circuits Conference, Santa Clara, California, May 1–4, 1995, pp. 447–450.

Gogaert, S., et al., "A 1 Gbit/s full–duplex CMOS driver/receiver for twisted–pair data–communication," 1998 Symposium On VLSI Circuits Digest of Technical Papers, Honolulu, Hawaii, Jun. 11–13, 1998, pp. 192–195.

Kim, S. et al.; *An 800Mbps Mulit–Channel CMOS Serial Link with 3x Oversampling*; pp. 451–454; IEEE 1995 Custom Integrated Circuits Conference.

Gotoh, K. et al.; *All–Digital Multi–Phase Delay Locked Loop for Internal Timing Generation in Embedded and/or High–Speed DRAMs*; pp. 107–108;1997 Symposium on VLSI Circuits Digest of Technical Papers.

Shin, H. et al.; A 250–Mbit/s CMOS Crosspoint Switch; pp. 478–486; IEEE Journal of Solid–State Circuits, vol. 24, No. 2, Apr. 1989.

Keiser, Bernhard E.; Sources of Radiated Interference and its Characteristics; pp. 25–34; Principles of Electromagnetic Compatibility; 1996; $3^{rd}$ Edition.

Spread Spectrum Modulation; Pseudo–Noise Sequences; pp. 578–611 (Chapter 9).

* cited by examiner

FIG. 1 Block diagram of overall system 100

FIG. 2 Pseudo-NMOS differential 10-bit serializer

FIG. 3 Differential voiltage driver 108

Circuit configurations of current mode driver (a) and voltage mode driver (b) (L=4nH, $C_1$=2pF and $C_2$=4pF)

FIG. 6 On-chip termination circuit

FIG. 7

Circuit configurations of external termination(a) and on-chip termination (b)(L=4nH, $C_1$=2pF and $C_2$=4pF)

CMOS DRIVER AND ON-CHIP TERMINATION FOR GIGABAUD SPEED DATA COMMUNICATION

CROSS-REFERENCE TO RELATED APPLICATIONS

The present application claims the benefit of U.S. provisional application serial No. 60/071,879, titled "1.25 GBaud CMOS Driver and On-Chip Termination for Gigabit Ethernet PHY Chip," invented by Gijung Ahn, Deog-Kyoon Jeong, and Gyudong Kim, and filed on Jan. 20, 1998. The present application is also a continuation-in-part of U.S. patent application Ser. No. 09/146,818, titled "System and Method for High-Speed, Synchronized Data Communication," invented by Deog-Kyoon Jeong and Gijung Ahn, and filed on Sep. 4, 1998 now U.S. Pat. No. 6,229,809.

BACKGROUND OF THE INVENTION

1. Technical Field

This invention relates to data communication systems. More particularly, this invention relates high-speed communications systems including high-speed transmitters and receivers.

2. Description of Related Art

As electronic and computer technology continues to evolve, communication of information among different devices, either situated near by or at a distance becomes increasingly important. For example, it is now more desirable than ever to provide for high speed communications among different chips on a circuit board, different circuit boards in a system, and different systems with each other. It is also increasingly desirable to provide such communications at very high speeds, especially in view of the large amount of data required for data communications in intensive data consuming systems using graphical or video information, multiple input-output channels, local area networks, and the like.

It is particularly desirable to enable individual personal computers, workstations, or other computing devices, within which data is normally internally transferred using parallel data buses, to communicate with each other over relatively simple transmission lines. Such transmission lines typically include only one or two conductors, in contrast with the 64-bit and wider data paths within computing systems now commonly available.

A communication system that includes oversampling is often utilized to recover transmitted data. Such a system includes a receiver which samples the incoming serial data stream at a rate greater than the rate at which symbols (bits) are being transmitted. For example, in a three-times (3x) oversampling receiver, the incoming data stream is sampled at a rate approximately three times the symbol rate. However, there are various problems to overcome in order to effectively implement such a receiver when the rate of data transmission is very high. For example, parasitic capacitance and inductance typically introduce substantial distortion into the received signal.

The physical layer of the Gigabit Ethernet standard (IEEE 802.3z) requires a so-called PHY chip which operates at gigabaud speeds. Traditionally, either GaAs or bipolar techniques have been used to implement such PHY chips. However, GaAs and bipolar circuits cannot be easily integrated with other CMOS (complementary metal-oxide-semiconductor) circuits and are typically more costly to manufacture than CMOS circuits.

SUMMARY OF THE INVENTION

The above described needs are met and problems are solved by the present invention. New very high-speed CMOS techniques are used to achieve a CMOS driver operating at gigabaud speeds. Such a driver may be manufactured more easily than drivers that use GaAs or bipolar techniques and further may be easily integrated with other CMOS circuits. A communication system utilizing the gigabaud CMOS driver may additionally include a receiver with on-chip termination to significantly reduce distortion in the presence of parasitic capacitance in inductance in comparison to a receiver with external termination. Furthermore, the communication system may include a phase tracker and a frame aligner. The phase tracker continously monitors the most frequent transition edges in the oversampled data so that the phase of the receiver clock keeps track of the sender clock. The frame aligner comprises a comma detector which enables instant synchronization of data words with a single comma character within a serial data stream.

DESCRIPTION OF THE PREFERRED EMBODIMENTS

Figure 1:
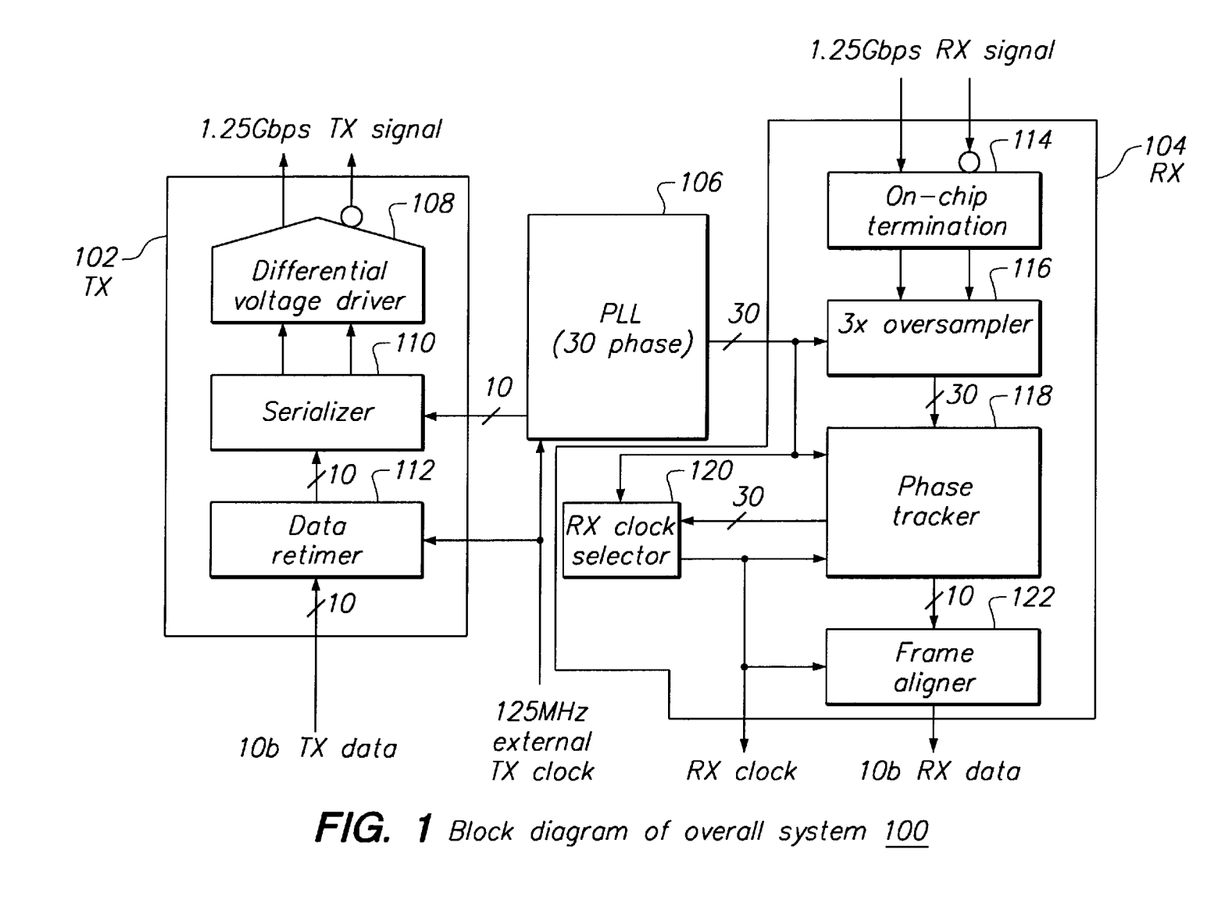
FIG. 1 shows a block diagram of a communication system utilizing a gigabaud CMOS driver in accordance with a preferred embodiment of the present invention.

FIG. 1 shows a block diagram of a communication system 100 utilizing a gigabaud CMOS driver 108 in accordance with a preferred embodiment of the present invention. The system 100 includes a transmitter (TX) 102, a receiver (RX) 104, and a phase-locked loop (PLL) 106.

As shown in FIG. 1, the transmitter 102 outputs a 1.25 gigabit per second (Gbps) signal to a transmission medium.

Of course, the particular speed of the signal may vary within the scope of the present invention. The transmitter 102 includes a differential voltage driver (the gigabaud CMOS driver) 108, a serializer 110, and a data retimer 112.

In accordance with a preferred embodiment, the data retimer 112 receives a 125 MHz external clock and a DC-balanced and limited run-length 10-bit parallel data stream from an encoder. The data retimer 112 utilizes the external clock to adjust the timing of the data stream.

The serializer 110 receives the adjusted 10-bit parallel data stream from the data retimer 112. The serializer 110 also receives 10 phase clocks from the PLL 106. The serializer 110 utilizes the 10 phase clocks to transform the 10-bit parallel data stream into a serial bit stream.

The differential voltage driver 108 receives the serial bit stream from the serializer 110. The differential voltage driver 108 drives the serial bit stream onto the medium at 1.25 Gbps, 10 times the 125 MHz speed of the external clock.

The transmission medium which carries the 1.25 Gbps signal is not terminated with a conventional external resistor. Instead, the transmission medium is terminated by an on-chip termination circuit 114 within the receiver 104. Use of the on-chip termination circuit 114 reduces signal distortion in comparison with external termination. The receiver 104 includes, in addition to the on-chip termination 114, a 3-times (3×) oversampler 116, a phase tracker 118, a RX clock selector 120, and a frame aligner 122.

The oversampler 116 receives the data signal from the on-chip termination 114. The oversampler 116 utilizes 30 phase clocks supplied by the PLL 106 to oversample the data signal and generate 30 sampled bits in parallel. The 3× oversampler 116 provides the 30 sampled bits in parallel to the phase tracker 118. The phase tracker 118 and the RX clock selector 120 operate to recover the clock and the data from the oversampled data and provides the recovered data stream to the frame aligner 122. In a preferred embodiment, the frame aligner 122 searches for a comma character in the recovered data stream and makes a near instant alignment of the boundary between words when such a comma character is found.

In accordance with a preferred embodiment of the system 100, a clock frequency difference between the TX 102 and the RX 104 of less than 0.1% is to be tolerated. The PLL 106 operates to keep the clock frequency difference within that tolerance.

Figure 2:
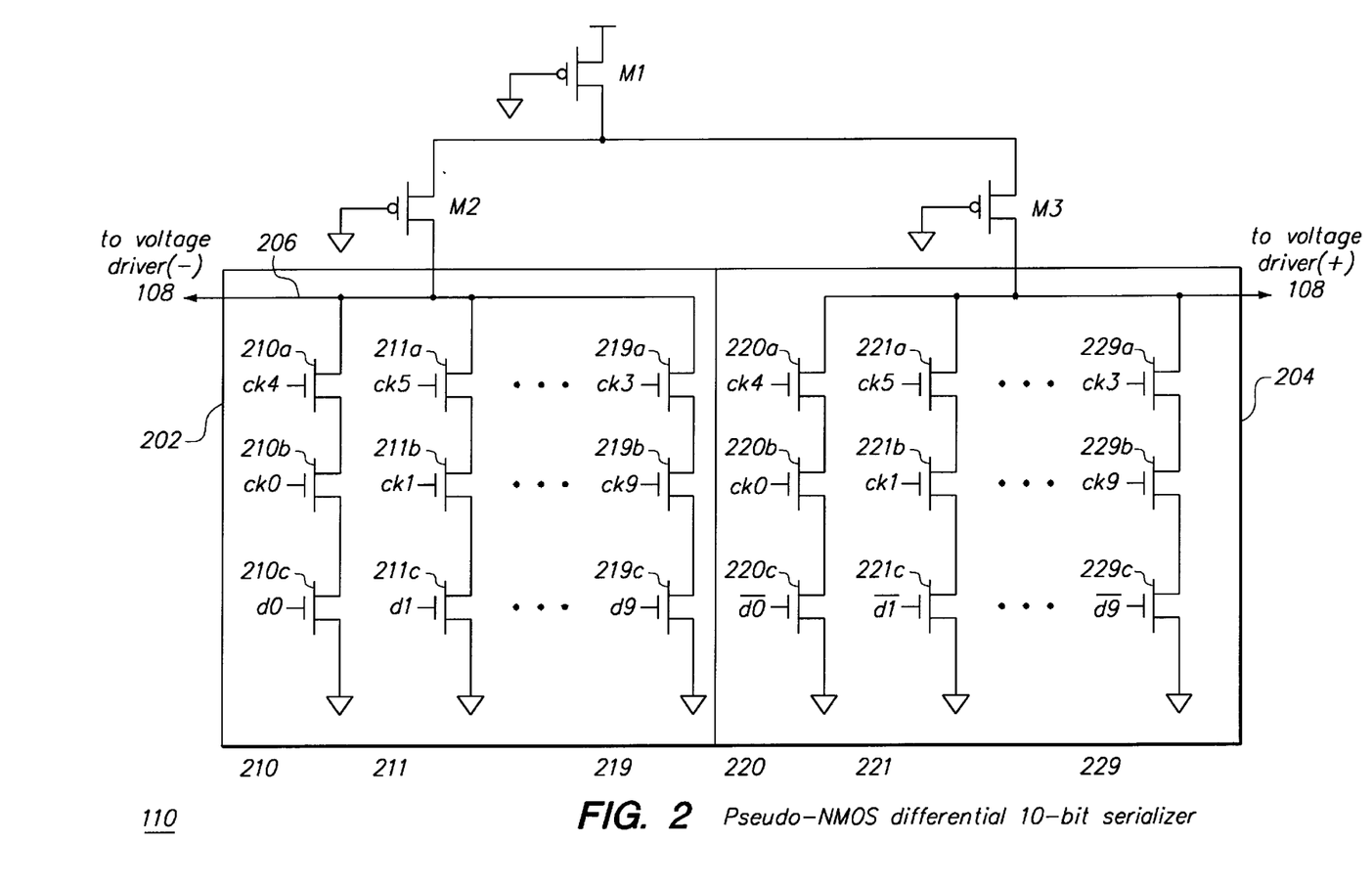
FIG. 2 shows a circuit diagram of a high-speed serializer in accordance with a preferred embodiment of the present invention.

FIG. 2 shows a circuit diagram of a high-speed serializer 110 in accordance with a preferred embodiment of the present invention. The serializer 110 comprises NMOS (n-type metal-oxide-semiconductor) transistors used as switching elements, and PMOS (p-type metal-oxide-semiconductor) transistors (M1, M2, M3) used as loads. These transistors are used to form differential pseudo-NMOS logic.

Regarding the PMOS transistors, M1 has its source coupled to a supply voltage, its gate coupled to an electrical ground, and its drain coupled to the sources of M2 and M3. Operationally, M1 pulls down the common mode voltage so that the output voltage moves around one-half the supply voltage (Vdd/2) with a small swing. M2 has its gate coupled to an electrical ground, and its drain coupled to a first NMOS transistor network 202. M3 has its gate coupled to an electrical ground, and its drain coupled to a second NMOS transistor network 204.

The first network 202 includes a first node 206 coupled to the drain of M2. The first node 206 is also coupled to the negative input terminal of the differential voltage driver 108. In addition, the first node 206 is coupled to ten columns (210, 211, ..., 219) of NMOS transistors. Each column 210–219 includes three NMOS transistors in series between the first node 206 and electrical ground. For example, the first column 210 includes a first NMOS transistor 210a whose source is coupled to the first node 206, a second NMOS transistor 210b whose source is coupled to the drain of the first NMOS transistor 210a, and a third NMOS transistor 210c whose source is coupled to the drain of the second NMOS transistor 210b and whose drain is coupled to an electrical ground. The gate of the first NMOS transistor 210a is coupled to receive a fifth phase clock signal (ck4) from the PLL 106. The gate of the second NMOS transistor 210b is coupled to receive a first phase clock signal (ck0) from the PLL 106. Finally, the gate of the third NMOS transistor 210c is coupled to receive a first data signal (d0) from the data retimer 112.

Similarly, the second column 211 includes three NMOS transistors (211a–211c) coupled in series between the first node 206 and an electrical ground. The gate of the first NMOS transistor 211a is coupled to receive a sixth phase clock signal (ck5) from the PLL 106. The gate of the second NMOS transistor 211b is coupled to receive a second phase clock signal (ck1) from the PLL 106. Finally, the gate of the third NMOS transistor 211c is coupled to receive a second data signal (d1) from the data retimer 112.

And so on for the other columns 212–219, incrementing the signals on the gates appropriately. For example, regarding the tenth column 219, the gate of the first NMOS transistor 219a is coupled to receive a fourth phase clock signal (ck3) from the PLL 106. The gate of the second NMOS transistor 219b is coupled to receive a tenth phase clock signal (ck9) from the PLL 106. Finally, the gate of the third NMOS transistor 219c is coupled to receive a tenth data signal (d9) from the data retimer 112.

The second network 204 includes a second node 208 coupled to the drain of M3. The second node 208 is also coupled to the positive input terminal of the differential voltage driver 108. In addition, the second node 208 is coupled to ten columns (220, 221, ..., 229) of NMOS transistors. Each column 220–229 includes three NMOS transistors in series between the second node 208 and electrical ground. For example, the first column 220 includes a first NMOS transistor 220a whose source is coupled to the second node 208, a second NMOS transistor 220b whose source is coupled to the drain of the first NMOS transistor 220a, and a third NMOS transistor 220c whose source is coupled to the drain of the second NMOS transistor 220b and whose drain is coupled to an electrical ground. The gate of the first NMOS transistor 220a is coupled to receive a fifth phase clock signal (ck4) from the PLL 106. The gate of the second NMOS transistor 220b is coupled to receive the first phase clock signal (ck0) from the PLL 106. Finally, the gate of the third NMOS transistor 220c is coupled to receive an inverted version of the first data signal (inverted d0) from the data retimer 112.

Similarly, the second column 221 includes three NMOS transistors (221a–221c) coupled in series between the second node 208 and an electrical ground. The gate of the first NMOS transistor 221a is coupled to receive a sixth phase clock signal (ck5) from the PLL 106. The gate of the second NMOS transistor 221b is coupled to receive a second phase clock signal (ck1) from the PLL 106. Finally, the gate of the third NMOS transistor 221c is coupled to receive an inverted version of the second data signal (inverted d1) from the data retimer 112.

And so on for the other columns 222–229, incrementing the signals on the gates appropriately. For example, regarding the tenth column 229, the gate of the first NMOS transistor 229a is coupled to receive a fourth phase clock signal (ck3) from the PLL 106. The gate of the second NMOS transistor 229b is coupled to receive a tenth phase clock signal (ck9) from the PLL 106. Finally, the gate of the third NMOS transistor 229c is coupled to receive an inverted version of the tenth data signal (d9) from the data retimer 112.

Figure 3:
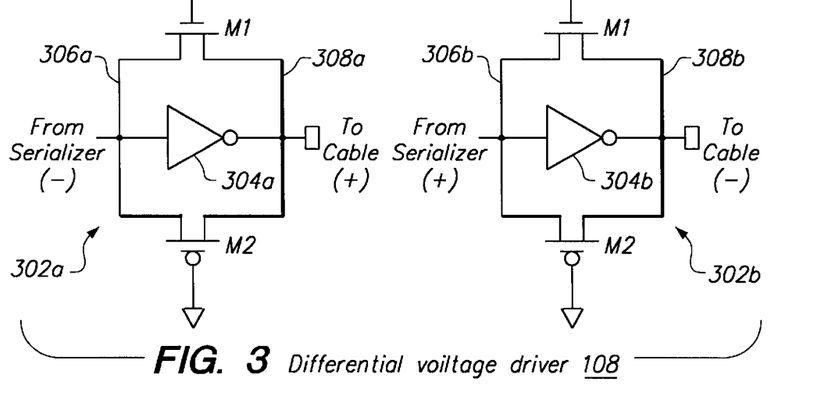
FIG. 3 shows a circuit diagram of a differential voltage driver in accordance with a preferred embodiment of the present invention.

FIG. 3 shows a circuit diagram of a differential voltage driver 108 in accordance with a preferred embodiment of the present invention. The communication system 100 uses such a differential voltage driver 108 instead of a current mode driver, because a current mode driver is not appropriate to drive a high speed signal onto a transmission line in the presence of large parasitic capacitance and inductance due to bonding wires and pads. The differential voltage driver 108 comprises a first inverter circuit 302a and a second inverter circuit 302b.

The first inverter circuit 302a comprises a NMOS transistor M1, a PMOS transistor M2, and an inverter 304a. The NMOS transistor M1 has its gate coupled to a supply voltage, its drain coupled to a first node 306a, and its source coupled to a second node 308a. The PMOS transistor M2 has its gate coupled to an electrical ground, its drain coupled to the first node 306a, and its source coupled to the second node 308a. The inverter 304a has its input coupled to the first node 306a and its output coupled to the second node 308a. The first node 306a is also coupled to receive the negative polarity (−) output from the serializer 110. The second node 308a is also coupled to output a positive polarity (+) output to the transmission medium (for example, a cable). Thus, the circuitry of the first inverter circuit 302a operates to receive the negative polarity data signal from the serializer 110, invert the signal, and output a positive polarity data signal to the transmission medium. M1 and M2 are used as feedback resistors which reduce the voltage swing of the inverter 304a as well as reducing the output impedance.

The second inverter circuit 302b comprises a NMOS transistor M1, a PMOS transistor M2, and an inverter 304b. The NMOS transistor M1 has its gate coupled to a supply voltage, its drain coupled to a first node 306b, and its source coupled to a second node 308b. The PMOS transistor M2 has its gate coupled to an electrical ground, its drain coupled to the first node 306b, and its source coupled to the second node 308b. The inverter 304b has its input coupled to the first node 306b and its output coupled to the second node 308b. The first node 306b is also coupled to receive the positive polarity (+) output from the serializer 110. The second node 308b is also coupled to output a negative polarity (−) output to the transmission medium (for example, a cable). Thus, the circuitry of the second inverter circuit 302b operates to receive the positive polarity data signal from the serializer 110, invert the signal, and output a negative polarity data signal to the transmission medium. M1 and M2 are used as feedback resistors which reduce the voltage swing of the inverter 304b as well as reducing the output impedance.

Figure 4A:
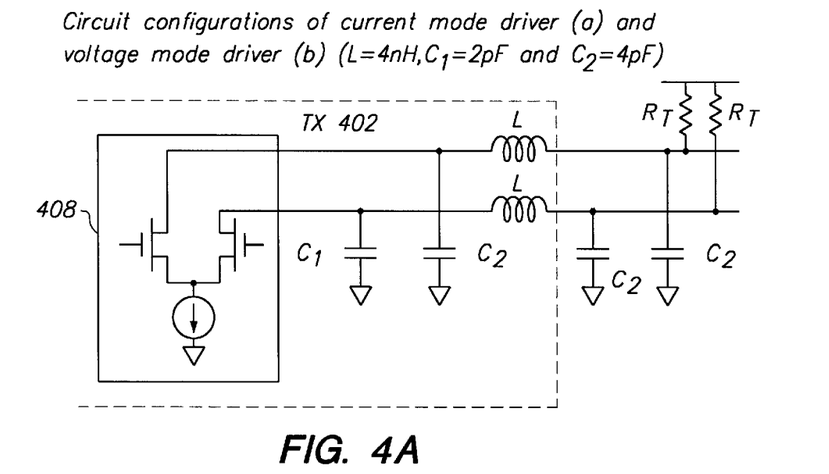
FIG. 4 shows typical circuit configurations of (a) a current mode driver and (b) a voltage mode driver in accordance with a preferred embodiment of the present invention.
Figure 4B:
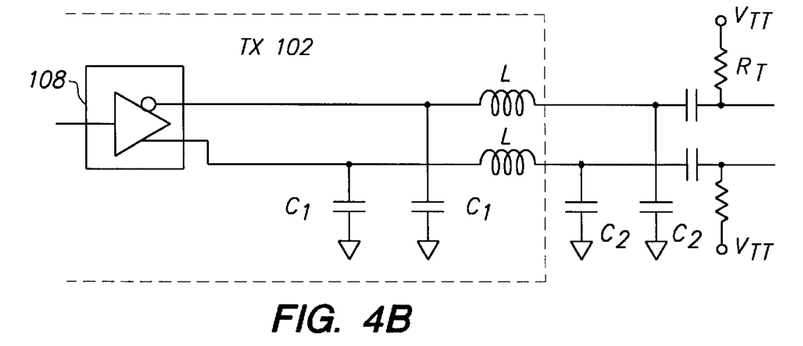

FIG. 4 shows typical circuit configurations of (a) a current mode driver 408 and (b) a voltage mode driver 108. The voltage mode driver 108 would be in accordance with a preferred embodiment of the present invention.

In both cases, the driver (408 or 108) is coupled to a transmission medium via a connection typically including bonding and wire pads. The transmission medium and connection thereto are modeled by two capacitors $C_1$ and $C_2$ and an inductor L for each of two lines. $C_2$ represents the capacitance of each transmission line, and each of the capacitors $C_2$ is coupled between a transmission line and an electrical ground. Each LC circuit (comprising inductor L and capacitor $C_1$) represents the parasitic inductance and capacitance due to the bonding wires and pads. The other end of the transmission medium is coupled to a receiver via an appropriate connection (including termination). The appropriate connection varies depending upon whether the driver is a current mode driver 408 or a voltage mode driver 108.

FIG. 5 shows simulated waveforms under the configurations shown in FIG. 4 in accordance with a preferred embodiment of the present invention. For purposes of the simulation, in order to model parasitic effects of the transmission medium and the connection thereto, the inductance L was set to be 4nH, and the two capacitors $C_1$ and $C_2$ were set to be 2 pF and 4 pF, respectively.

Figure 5A:
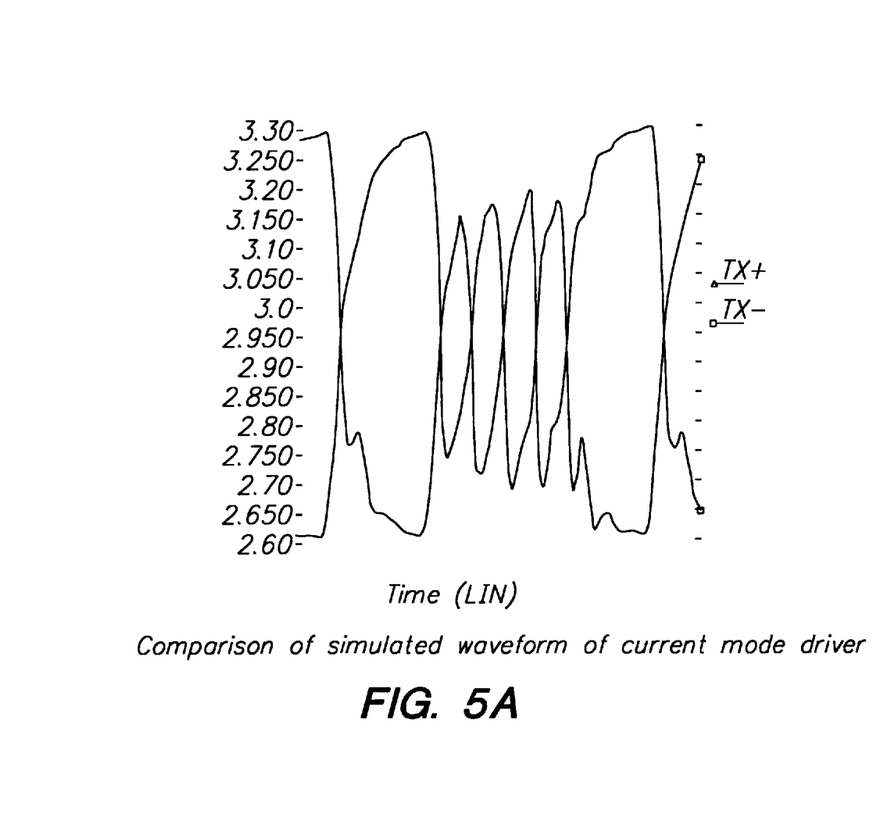
FIG. 5 shows simulated waveforms under the configurations shown in FIG. 4 in accordance with a preferred embodiment of the present invention.
Figure 5B:
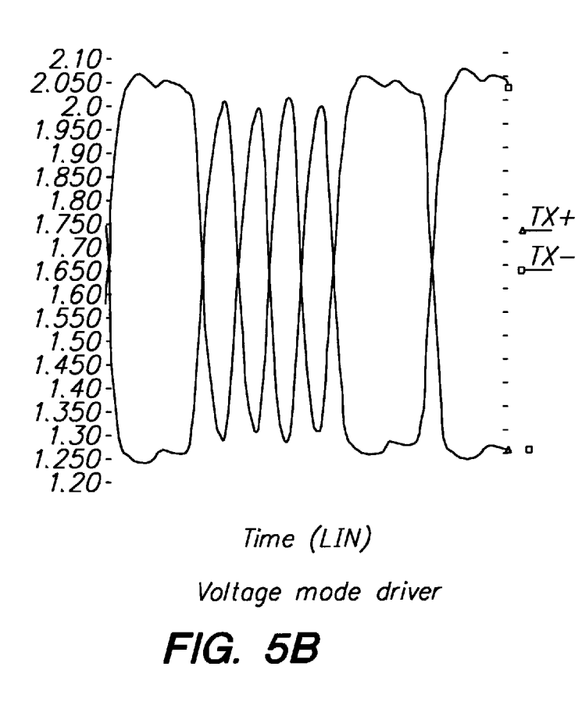

As shown in FIG. 5(a), significant inter-symbol interference occurs in the current mode driver 408 configuration. This inter-symbol interference may be attributed to slow, passive pull-up and constant current pull-down. In contrast, as shown in FIG. 5(b), only an insignificant amount of distortion occurs in the voltage mode driver 108 configuration. This is because the voltage mode driver 108 drives the signal actively in both directions (up and down).

Figure 6:
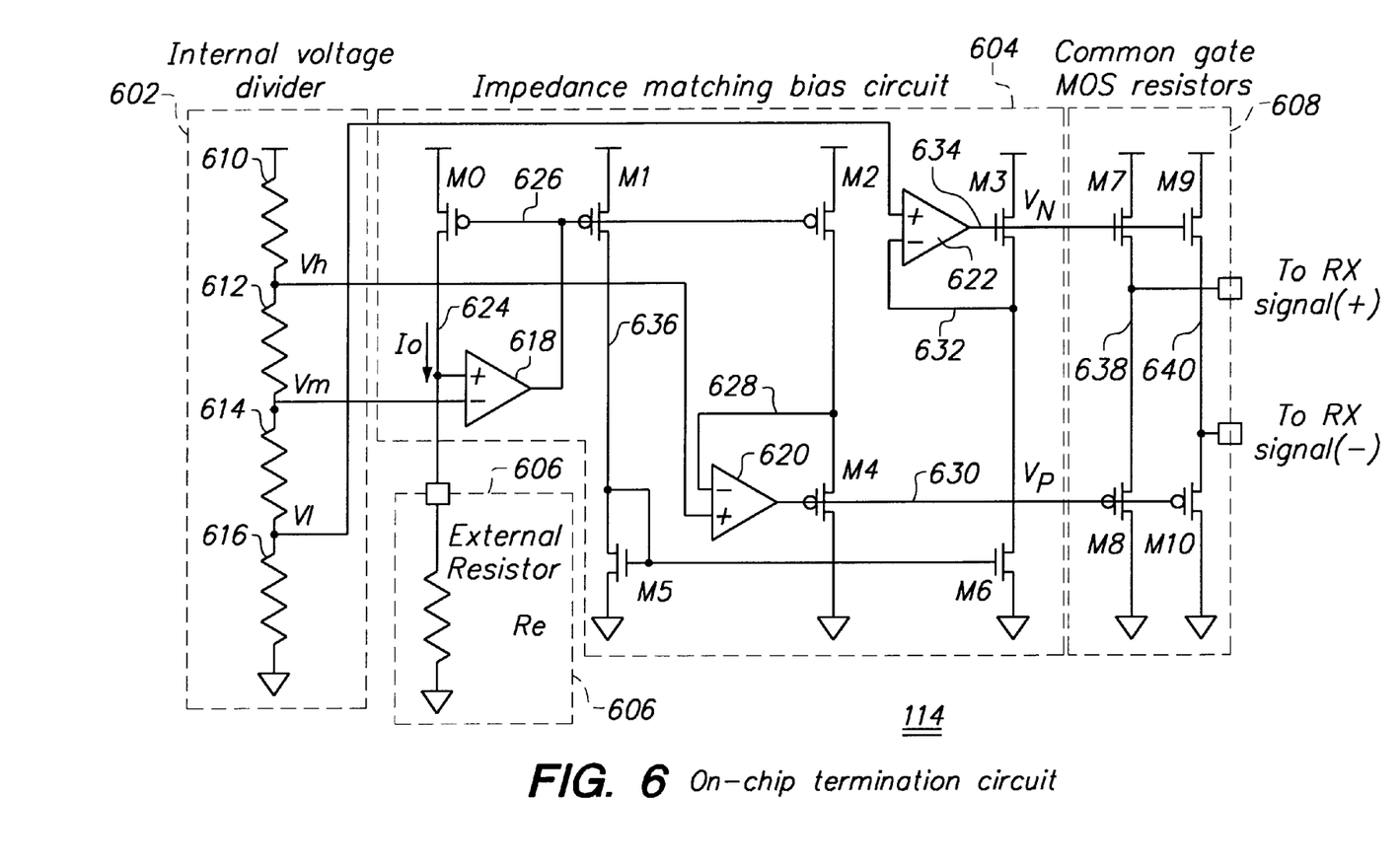
FIG. 6 shows a circuit diagram of an on-chip termination circuit in accordance with a preferred embodiment of the present invention.

FIG. 6 shows a circuit diagram of an on-chip termination circuit 114 in accordance with a preferred embodiment of the present invention. As shown in FIG. 6, the on-chip termination circuit is based on a common gate CMOS configuration. In particular, the on-chip termination circuit 114 includes an internal voltage divider 602, an impedance matching bias circuit 604, an external resistor 606, and a configuration of common gate MOS transistors 608.

In accordance with a preferred embodiment, the internal voltage divider 602 includes four resistors (610, 612, 614, 616) and three nodes ($V_h$, $V_m$, and $V_l$). The four resistors are coupled in series between a supply voltage and an electrical ground. The three nodes exist between the four resistors. The first resistor 610 couples the supply voltage to the first node $V_h$. The second resistor 612 couples the first node $V_h$ to the second node $V_m$. The third resistor 614 couples the second node $V_m$ to the third node $V_l$. The fourth resistor 616 couples the third node $V_l$ to an electrical ground. The voltage at $V_h$ is relatively high, the voltage at $V_l$ is relatively low, and the voltage at $V_m$ is in between. Finally, each of the three nodes is coupled to the bias circuit 604. Thus, the internal voltage divider 602 generates three reference voltages.

In a preferred embodiment, the bias circuit 604 includes three operational amplifiers (opamps) 618, 620, and 622 and 7 transistors (M0–M6). The first opamp 618 has its negative terminal coupled to $V_m$ of the voltage divider 602, its positive terminal coupled to a first node 624, and its output terminal coupled to a second node 626. The second opamp 620 has its positive terminal coupled to of the voltage divider 602, its negative terminal coupled to a third node 628, and its output terminal coupled to a fourth node 630. The fourth node 630 is also labeled as voltage $V_p$. The third opamp 622 has its positive terminal coupled to $V_l$, its negative terminal coupled to a fifth node 632, and its output terminal coupled to a sixth node 634. The sixth node 634 is also labeled as voltage $V_N$.

The first transistor M0 comprises a PMOS transistor having its source coupled to a supply voltage, its drain coupled to the first node 624, and its gate coupled to the second node 626. The second transistor M1 comprises a PMOS transistor having its source coupled to a supply voltage, its drain coupled to a seventh node 636, and its gate coupled to the second node 626. The third transistor M2 comprises a PMOS transistor having its source coupled to a supply voltage, its drain coupled to the third node 628, and its gate coupled to the second node 626. Thus, each of the first three transistors M0–M2 comprise PMOS transistor having their gates controlled by the output of the first opamp 618.

The fourth transistor M3 comprises a NMOS transistor having its source coupled to a supply voltage, its drain coupled to the fifth node 632, and its gate coupled to the sixth node 634 ($V_N$). The fifth transistor M4 comprises a PMOS transistor having its source coupled to the third node 628, its drain coupled to an electrical ground, and its gate coupled to the fourth node 630 ($V_P$). The sixth transistor M5 comprises a NMOS transistor having its source and its gate both coupled to the seventh node 636, and its drain coupled to an electrical ground. Finally, the seventh transistor M6 comprises a NMOS transistor having its source coupled to the fifth node 632, its drain coupled to an electrical ground, and its gate coupled to the seventh node 636.

The external resistor 606 includes a resistor, denoted as having a resistance value of Re, coupled between the first node 624 of the bias circuit 604 and an electrical ground. The external resistor 606 is used as a reference impedance.

The common gate MOS transistors 608 include two NMOS transistors M7 and M9, and two PMOS transistors M8 and M0. The first NMOS transistor M7 has its source coupled to a supply voltage, its drain coupled to a first output node 638, and its gate coupled to the sixth node 634 of the bias circuit 604. The first PMOS transistor M8 has its source coupled to the first output node 638, its drain coupled to an electrical ground, and its gate coupled to the fourth node 630 of the bias circuit 604. The first output node 638 is coupled to the positive polarity line from the transmission medium for termination purposes. The second NMOS transistor M9 has its source coupled to a supply voltage, its drain coupled to a second output node 640, and its gate coupled to the sixth node 634 of the bias circuit 604. The second PMOS transistor M10 has its source coupled to the second output node 640, its drain coupled to an electrical ground, and its gate coupled to the fourth node 630 of the bias circuit 604. The second output node 640 is coupled to the negative polarity line of the transmission medium for termination purposes.

Operationally, the bias circuit 604 controls the termination voltage and impedance by providing bias voltages $V_P$ and $V_N$ to the gates of the common gate MOS transistors 608. Within the bias circuit 604, transistors M0, M1, M2, M5 and M6 are connected as current mirrors. All currents in the current mirrors are set as $V_m/Re$. Transistors M7 and M9 are replicas of M3. Transistors M8 and M10 are replicas of M4. M3 generates current Io at $V_l$. M4 generates current Io at $V_h$.

Figure 7:
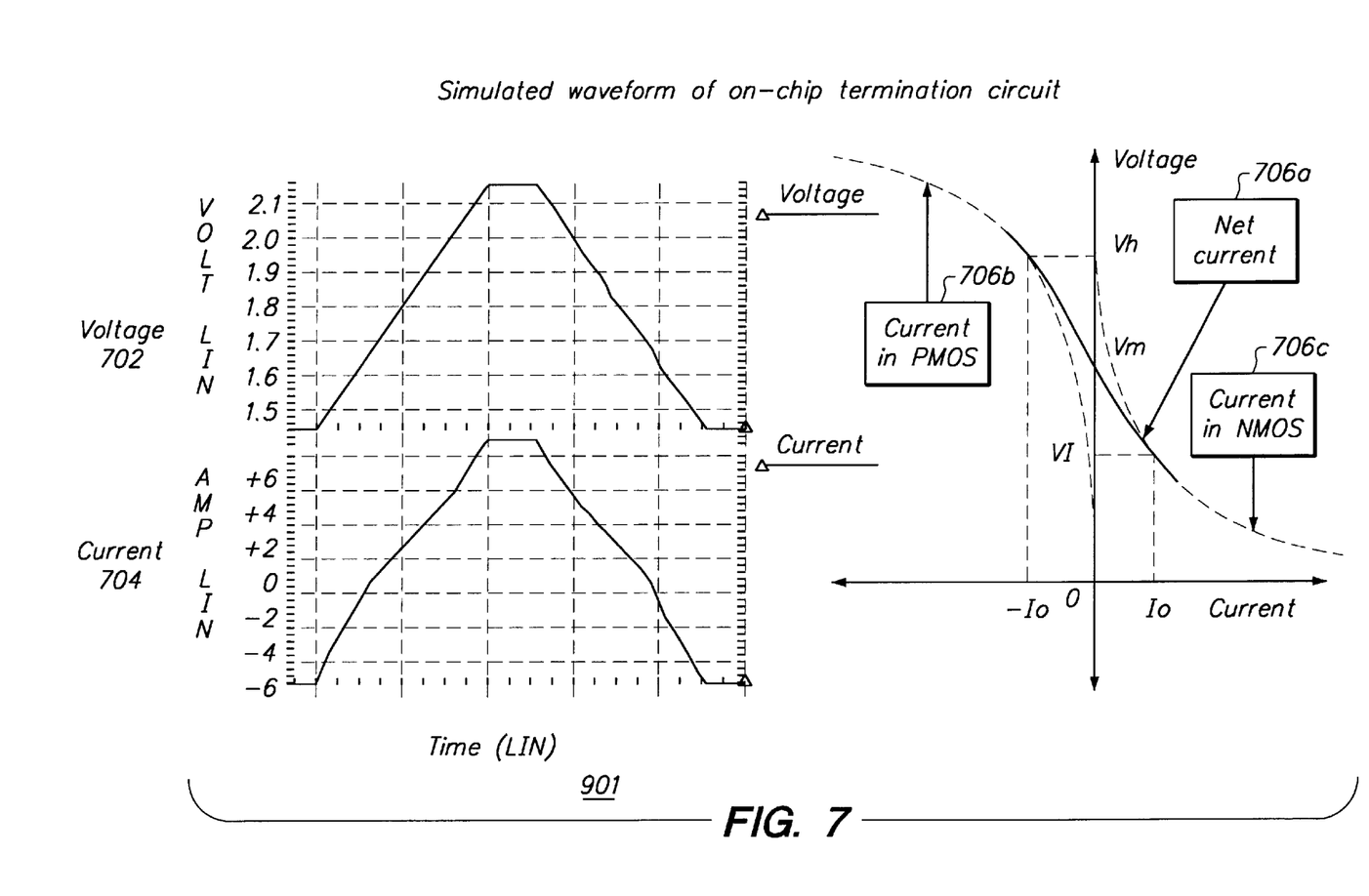
FIG. 7 shows the characteristics of the on-chip termination circuit shown in FIG. 6 for a 75 ohm transmission line in accordance with a preferred embodiment of the present invention.

FIG. 7 shows the characteristics of the on-chip termination circuit 114 shown in FIG. 6 for a 75 ohm transmission line in accordance with a preferred embodiment of the present invention. Both voltage 702 and current 704 characteristics are shown. In addition, a voltage versus current graph 706 is also shown.

The voltage vs. current graph 706 shows net current 706a, PMOS transistor current 706b, and NMOS transistor current 706c. The graph 706 shows that although the impedance of either the PMOS transistor or the NMOS transistor is not linear, the combined effect of the PMOS and NMOS transistors is almost linear when the voltage is around Vdd/2. In particular, when the resistor values in the voltage divider are such that $(V_h-V_m)=(V_m-V_l)$, then the relation between termination resistance $R_T$ and external resistance Re is as follows:

$$R_T=(V_h-V_m)/Io=Re\cdot(V_h-V_m)/V_m$$

The above equation shows that impedance is independent of supply voltage because both $(V_h-V_m)$ and $V_m$ are proportional to Vdd. There is a trade-off between power consumption and termination resistance range.

FIG. 8 contrasts (a) a conventional receiver configuration 801 using external termination 806 outside the conventional receiver 804 with (b) the receiver configuration 802 which utilizes on-chip termination 114 within the receiver 104 in accordance with a preferred embodiment of the present invention. As shown in FIG. 8, the conventional receiver configuration 801 has the external termination 806 placed in between the capacitance $C_2$ of the transmission medium and the LC circuit (L and C1) on the conventional receiver 804. In contrast, the receiver configuration 802 has the on-chip termination 114 between the LC circuit (L and C1) on the conventional receiver 804 and the rest of the conventional receiver 804.

Figure 8A:
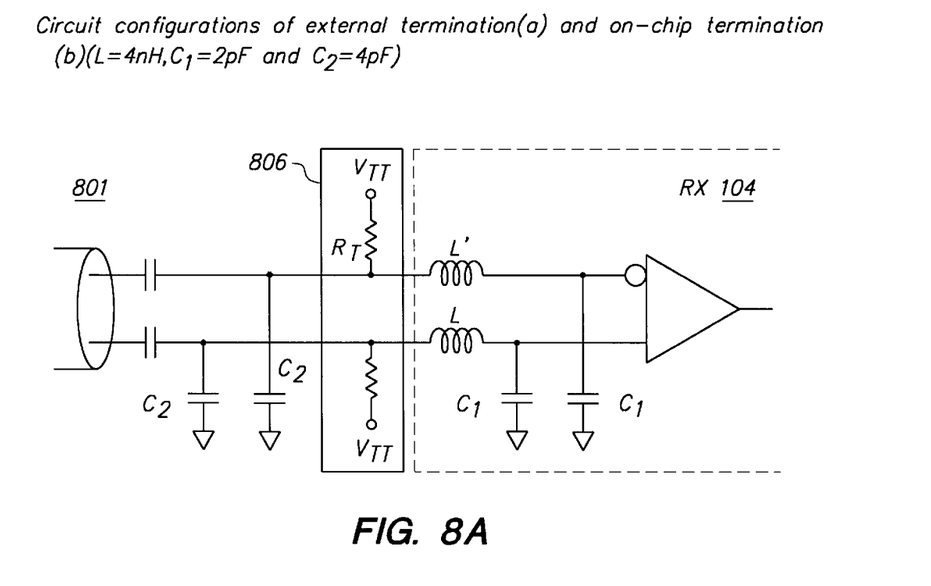
FIG. 8 contrasts (a) a conventional receiver configuration using external termination outside the conventional receiver with (b) the receiver configuration which utilizes on-chip termination within the receiver in accordance with a preferred embodiment of the present invention.
Figure 8B:
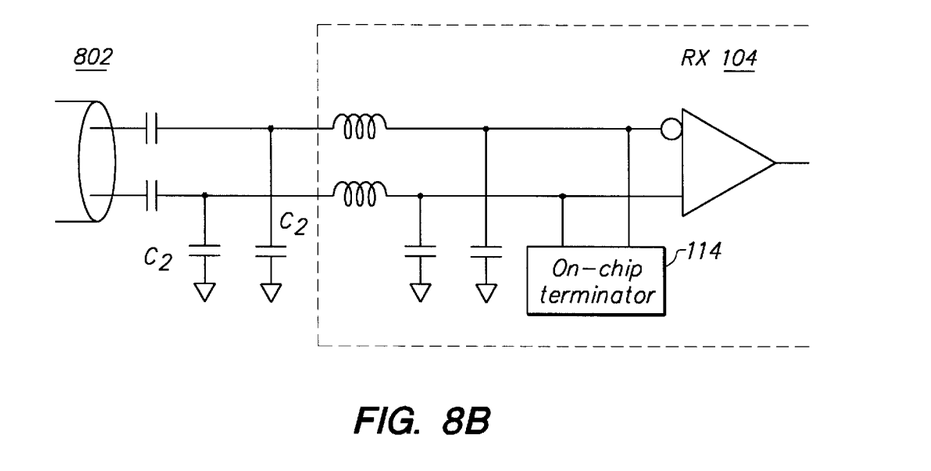
Figure 9A:
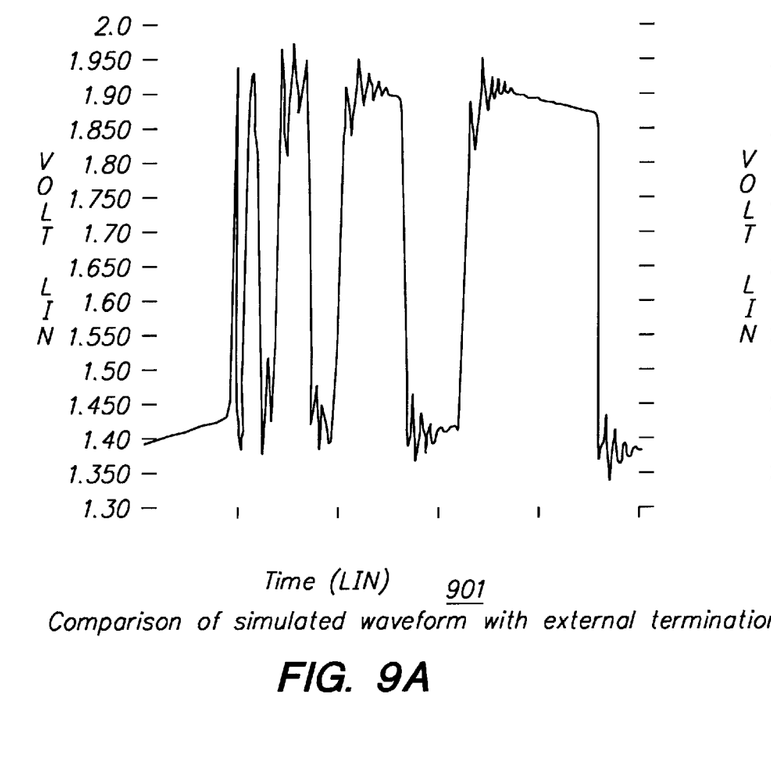
FIG. 9 contrasts (a) a simulated waveform in a receiver using external termination in accordance with FIG. 8(a) with (b) a simulated waveform in a receiver utilizing on-chip termination in accordance with FIG. 8(b).
Figure 9B:
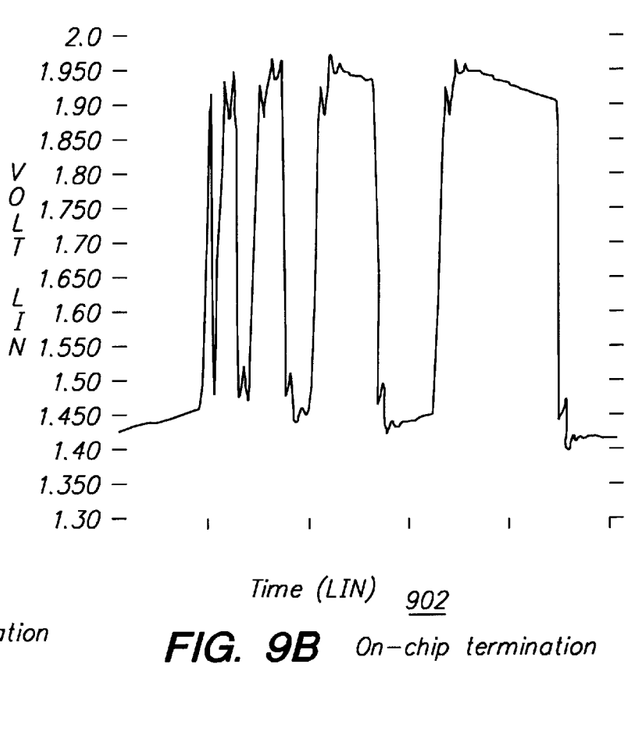

FIG. 9 contrasts (a) a first simulated waveform 901 in a receiver using external termination in accordance with FIG. 8(a) with (b) a second simulated waveform 902 in a receiver utilizing on-chip termination in accordance with FIG. 8(b). The simulations were run assuming the following values: L=4 nH, $C_1$=2 pF, and $C_2$=4 pF. The simulations also assumed an ideal rectangular pulse train driven through a 75 ohm medium. As shown in FIG. 9, significantly reduced distortion can be seen in the second simulated waveform 902 in comparison to the first simulated waveform 901. Thus, using the on-chip termination 114 reduces distortion of the received signal.

Figure 10A:
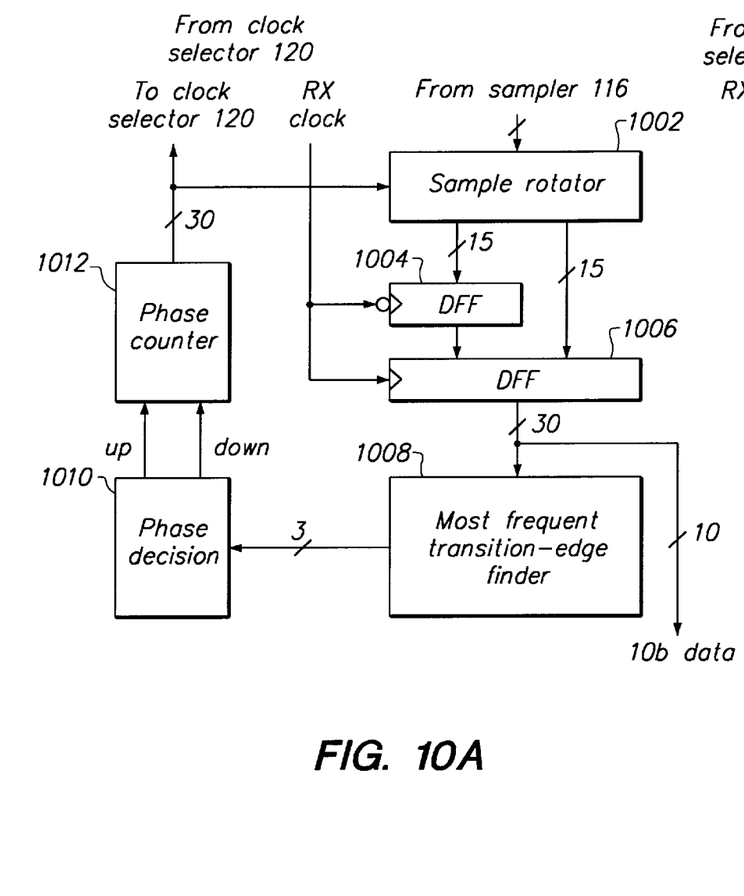
FIG. 10 shows a block diagram of (a) a phase tracker and (b) a frame aligner in accordance with a preferred embodiment of the present invention.

FIG. 10 shows a block diagram of (a) a phase tracker 118 and (b) a frame aligner 122 in accordance with a preferred embodiment of the present invention. In the preferred embodiment shown in FIG. 10(a), the phase tracker 118 includes a sample rotator 1002, a first D-type flip flop (DFF) array 1004, a second D-type flip flop (DFF) array 1006, a most frequent transition-edge finder 1008, a phase decision circuit 1010, and a phase counter 1012.

In a preferred embodiment, the rotator 1002 receives thirty samples in parallel from the sampler 116. The rotator 1002 applies a signal from the phase counter 1012 to shuffle the samples and to the timing of the samples into a RX clock domain. The rotated samples are provided by the rotator 1002 to the DFF arrays 1004 and 1006. Both the two DFF arrays 1004 and 1006 also receives the RX clock signal from the RX clock selector 120 for control purposes. In particular, the first 15 samples are provided to the first DFF array 1004, and the second 15 samples are provided to a second half of the second DFF array 1006. The first DFF array 1004 provides its contents to a first half of the second DFF array 1006. The second DFF array 1006 outputs 10 bits of data in parallel to the frame aligner 122, and also outputs its contents to the finder 1008.

In a preferred embodiment, the finder 1008 determines the most frequent transition-edge in the contents provided by the second DFF 1006. The most frequent edge information is passed from the finder to the phase decision circuit 1010. By continuously monitoring the most frequent transition-edge in the oversampled data, the phase of the RX clock keeps track of the sender's clock. In a preferred embodiment, the phase decision circuit 1010 uses the most frequent transition-edge information to determine whether an up signal or a down signal should be sent to the phase counter 1012. The phase counter 1012 applies any up or down signal received from the phase decision circuit 1010 and provides a 10-bit phase pointer to the rotator 1002 and to the clock selector 120. The phase pointer indicates which clock among the 30 PLL clocks is closest to the clock of the transmitter 102.

Figure 10B:
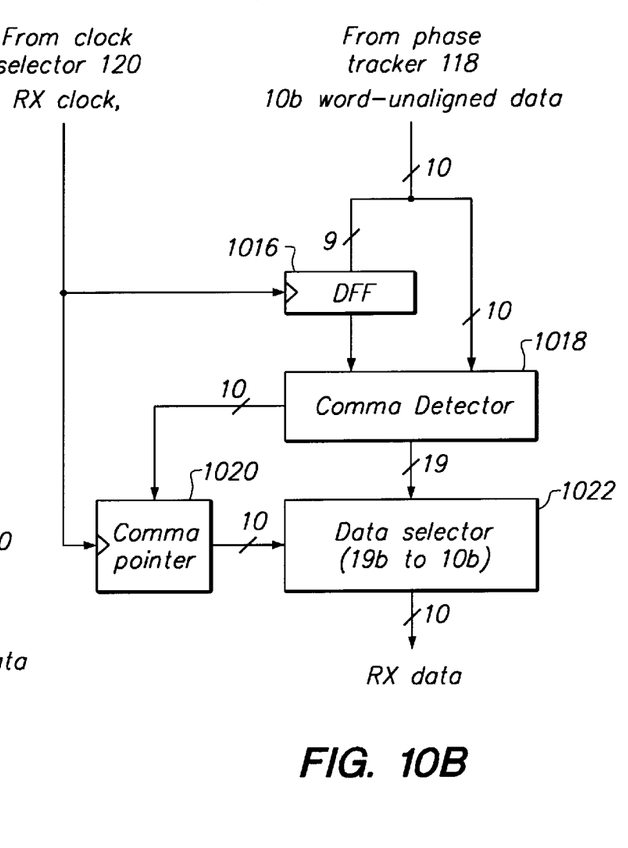

In the preferred embodiment shown in FIG. 10(b), the frame aligner 122 includes a D-type flip flop (DFF) array 1016, a comma detector 1018, a comma pointer 1020, and a data selector 1022. The DFF array 1016 stores the previous 9 bits of word-unaligned data from the phase tracker 118 and provides them to a comma detector 1018. The comma detector 1018 also receives the current 10 bits of word-unaligned data from the phase tracker 118. The comma detector 1018 searches across the 19 bit data sequence to detect any comma which would comprise the sequence of bits 0011111010. The detected position of a comma is stored using a comma pointer 1020. The comma pointer 1020 is used by the data selector 1022 to extract the word aligned 10 bits of data until a new comma is detected.

What is claimed is:

1. A system for high speed communication of digital data comprising:

a transmission medium including a first end and a second end;

a transmitter coupled to the first end of the transmission medium for converting the digital data to a data signal and for driving the digital signal onto the transmission medium, the transmitter including a complementary metal-oxide-semiconductor (CMOS) voltage driver; and a receiver coupled to the second end of the transmission medium for receiving the data signal from the transmission medium and for recovering the digital data from the data signal, the receiver including on-chip termination for substantially reducing distortion in the data signal.

2. The system of claim 1, wherein the data signal comprises a serial data signal, and the transmitter further includes a high speed serializer.

3. The system of claim 1, wherein the CMOS voltage driver drives the data signal onto the transmission medium at least at gigabaud speed.

4. The system of claim 1, further comprising:

a phase-locked loop coupled to the transmitter and to the receiver, the phase-locked loop receiving a clock signal from the transmitter, generating a plurality of clock signals with different phases based on the clock signal, and providing the plurality of clock signals with different phases to the receiver.

5. The system of claim 4, wherein the phase-locked loop further provides a subset of the plurality of clock signals with different phases to the transmitter.

6. The system of claim 5, wherein the reveiver further includes an oversampler for receiving the plurality of clock signals with different phases and applying the plurality of clock signals with different phases to oversample the data signal and so generate an oversampled data signal.

7. The system of claim 6, wherein the receiver further includes phase tracking circuitry for receiving the oversampled data signal and for monitoring a most frequent transition edge in the oversampled data in order to keep track of the clock signal from the transmitter.

8. The system of claim 7, the receiver further comprises:

a clock selector coupled to the phase tracking circuitry and to the phase-locked loop, the clock selector and the phase tracker operative to recover the clock and the data from the oversampled data.

9. A receiver for receiving a data signal from a transmission medium and for recovering digital data from the data signal, the receiver comprising:

an on-chip termination circuit for substantially reducing distortion in the data signal the on-chip termination circuit comprising an internal voltage divider for generating reference voltages;

an impedance matching bias circuit coupled to the internal voltage divider; and common gate MOS resistors coupled to the impedance matching bias circuit, the impedance matching circuit controlling a termination voltage and impedance by providing bias voltages to gates of the common gate MOS transistors.

10. The receiver of claim 9, further comprising:

an oversampler for applying a plurality of clock signals with different phases to oversample the data signal and so generate an oversampled data signal.

11. The receiver of claim 10, wherein the receiver further includes phase tracking circuitry for monitoring a most frequent transition edge in the oversampled data in order to keep track of a clock signal from a transmitter which drove the data signal onto the transmission medium.

12. The receiver of claim 9, further comprising:

a comma detector for finding comma characters in the data signal for purposes of data word synchronization.

13. The receiver of claim 9, wherein the common gate MOS resistors comprise: common-gate PMOS and NMOS transistors, the PMOS and NMOS transistors being operative to increase the linearity of the current and voltage relations and to increase the allowable voltage- current range for high-speed signal termination.

14. The receiver of claim 9, wherein the on-chip termination circuit further comprises:

an external resistor coupled between a first node of the impedance matching bias circuit and an electrical ground, the external resistor operative to act as a reference impedance.

15. The receiver of claim 9, wherein the internal voltage divider comprises:

three nodes providing three reference voltages Vh, Vm, Vl, to the impedance matching bias circuit.

16. The receiver of claim 11, wherein the phase tracking circuitry comprises a sample rotator coupled to the oversampler, the sample rotator operative to rotate the samples and to provide the rotated samples as output.

17. A transmitter for converting digital data to a data signal and for driving the data signal onto a communication medium, the transmitter comprising:

a CMOS voltage driver for driving the data signal onto the transmission medium at least at gigabaud speed, the driver comprising a first inverter circuit and a second inverter circuit, the first inverter circuit comprising:

a NMOS transistor Ml having a gate coupled to a supply voltage, a drain coupled to a first node and a source coupled to a second node;

a PMOS transistor M2 having a gate coupled to an electrical ground, a drain coupled to the first node and a source coupled to the second node; and an inverter having an input coupled to the first node and an output coupled to the second node, the first node being adapted to receive a negative polarity output, the second node being adapted to output a positive polarity output onto the communication medium, the second inverter circuit comprising:

a NMOS transistor Ml having a gate coupled to a supply voltage, a drain coupled to a first node and a source coupled to a second node;

a PMOS transistor M2 having a gate coupled to an electrical ground, a drain coupled to the first node and a source coupled to the second node; and an inverter having an input coupled to the first node and an output coupled to the second node, the first node being adapted to receive a positive polarity output, the second node being adapted to output a negative polarity output onto the communication medium.

18. The transmitter of claim 17, where the data signal comprises a serial data signal, and the transmitter further includes a high speed serializer.

\* \* \* \* \*